(12) United States Patent
Hasegawa et al.

(10) Patent No.: US 8,028,051 B2
(45) Date of Patent: Sep. 27, 2011

(54) APPARATUS FOR ADJUSTING USE RESOURCES OF SYSTEM AND METHOD THEREOF

(75) Inventors: Hiroki Hasegawa, Kawasaki (JP); Katsuhito Minai, Kawasaki (JP); Toshiaki Uematsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1033 days.

(21) Appl. No.: 10/806,211

(22) Filed: Mar. 23, 2004

(65) Prior Publication Data

US 2004/0210871 A1 Oct. 21, 2004

(30) Foreign Application Priority Data

Apr. 16, 2003 (JP) ................................. 2003-111301

(51) Int. Cl.
*G06F 15/173* (2006.01)
*G06F 15/16* (2006.01)
*G06F 9/44* (2006.01)

(52) U.S. Cl. ......... 709/223; 709/226; 709/205; 717/120

(58) Field of Classification Search .................. 717/120, 717/136, 106; 709/223
See application file for complete search history.

(56) References Cited

U.S. PATENT DOCUMENTS

| | | | | |
|---|---|---|---|---|
| 6,870,926 | B2 * | 3/2005 | Shambaugh et al. | 379/265.05 |
| 6,874,099 | B1 * | 3/2005 | Balasubramanian et al. | 714/4 |
| 7,047,386 | B1 * | 5/2006 | Ngai et al. | 711/170 |
| 2002/0152305 | A1 * | 10/2002 | Jackson et al. | 709/224 |
| 2003/0046396 | A1 * | 3/2003 | Richter et al. | 709/226 |
| 2003/0086557 | A1 * | 5/2003 | Shambaugh et al. | 379/266.07 |
| 2006/0248529 | A1 * | 11/2006 | Loboz et al. | 718/100 |

FOREIGN PATENT DOCUMENTS

| | | |
|---|---|---|
| JP | 7-219787 | 8/1995 |
| JP | 10124333 | 5/1998 |
| JP | 10-283209 | 10/1998 |
| JP | 2001022597 | 1/2001 |
| JP | 2002-99435 | 4/2002 |
| JP | 2002268920 | 9/2002 |
| JP | 2002342269 | 11/2002 |
| JP | 2003-67351 | 3/2003 |

OTHER PUBLICATIONS

Solaris 9 System Administrator Collection, System Administration Guide: Resource Management and Network Services, Chapter 9, Fair Share Scheduler, printed Mar. 12, 2002 from docs.sun.com, pp. 1-12.
Sun Microsystems—Solaris 9 Resource Manager, World Wide Web page in Japanese, printed Mar. 11, 2003, pp. 1-5.
Sun Microsystems—Solaris 9 Resource Manager, World Wide Web page in English, printed Jun. 10, 2004, pp. 1-6.

(Continued)

*Primary Examiner* — Peling A Shaw
*Assistant Examiner* — Joiya M Cloud
(74) *Attorney, Agent, or Firm* — Staas & Halsey LLP

(57) ABSTRACT

The transition of a use resource amount is predicted from the transition of a transaction occurrence amount for each module by using a function that expresses a correlation between a past transaction processing amount and a past use resource amount in a data processing system. After this, an allocation resource amount for each module is automatically fluctuated in accordance with the transition of the predicted use resource amount.

11 Claims, 17 Drawing Sheets

OTHER PUBLICATIONS

Murthy V. Devarakonda et al., "Predictability of Process Resource Usage: A Measurement-Based Study on UNIX", IEEE Transactions on Software Engineering, vol. 15, No. 12, Dec. 1989, pp. 1579-1586.

Kumar K. Goswami et al., "Prediction-Based Dynamic Load-Sharing Heuristics", IEEE Transactions on Parallel and Distributed Systems, vol. 4, No. 6, 1993, pp. 638-648.

Thomas L. Casavant et al., "A Taxonomy of Scheduling in General-Purpose Distributed Computing Systems", vol. 14, No. 2, Feb. 1988, pp. 141-154.

Communication from the European Patent Office dated Jun. 14, 2005.

Japanese Patent Office Action, mailed Jul. 24, 2007 and issued in corresponding Japanese Patent Application No. 2003-111301.

* cited by examiner

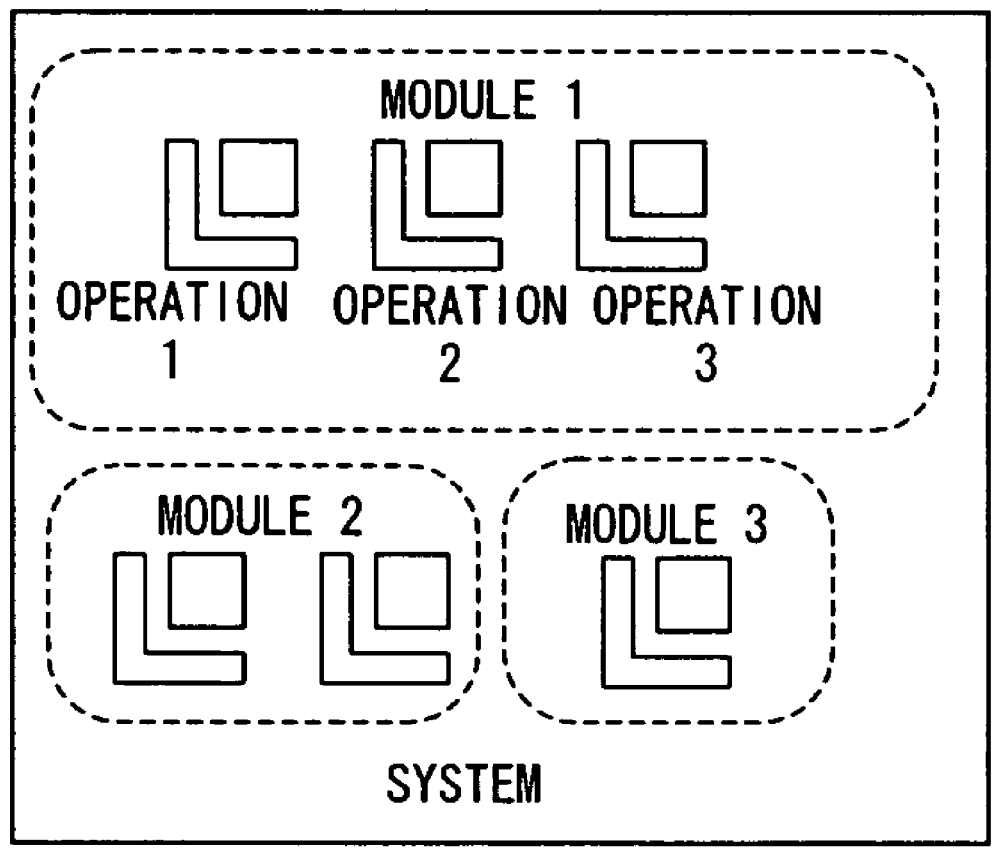
F I G. 1

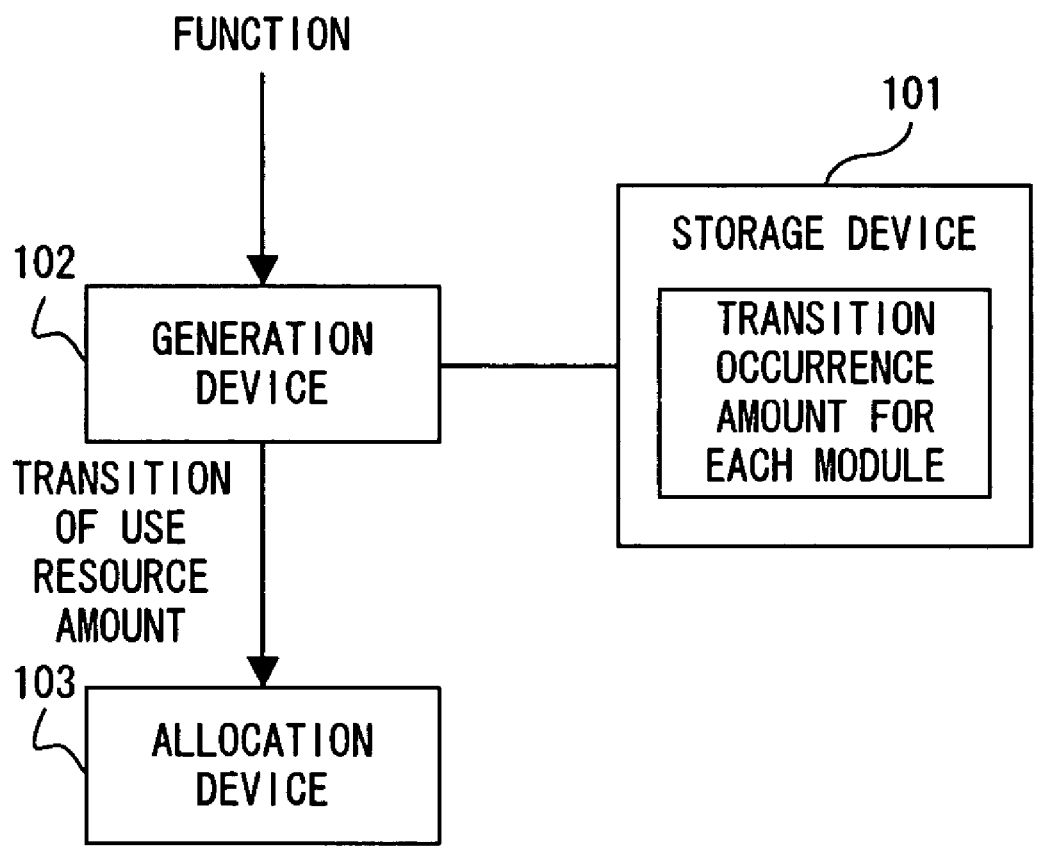
F I G. 2

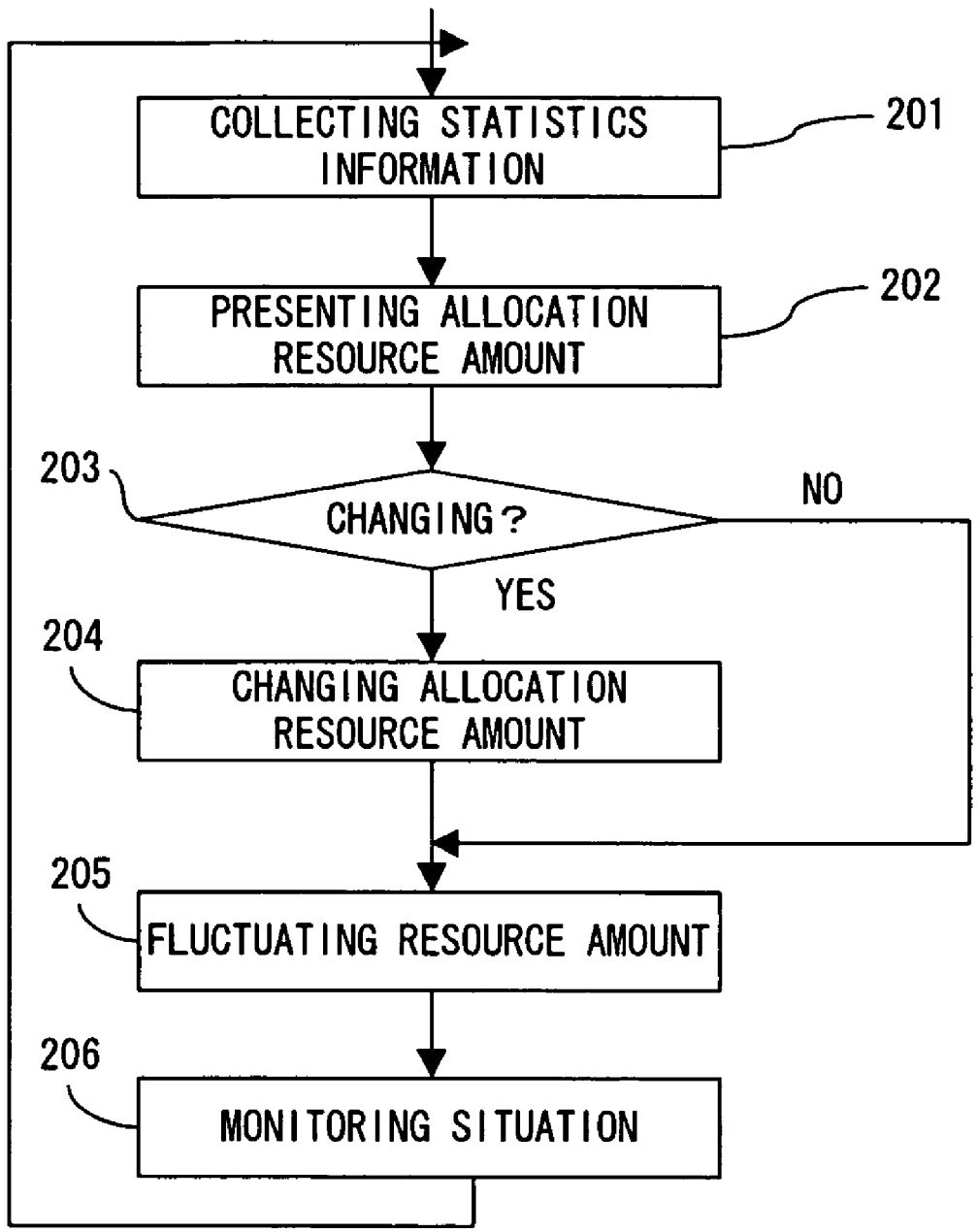
F I G. 3

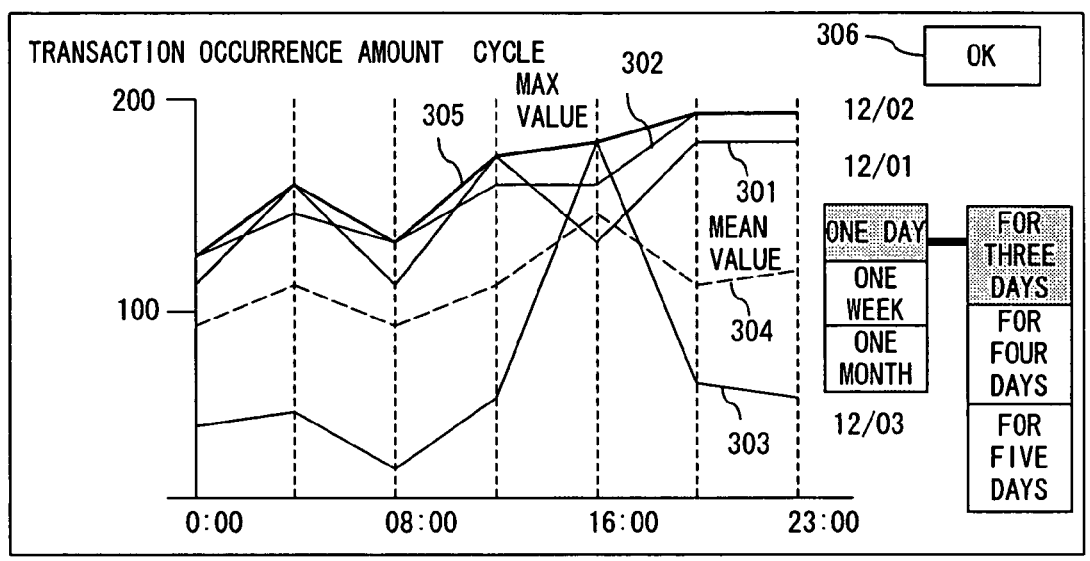
F I G. 4 A

| | MODULE NAME | Module 1 |
|---|---|---|
| 901 | | |
| 902 | CPU ALLOCATION AMOUNT | 50% |
| 903 | MEMORY ALLOCATION AMOUNT | 50% |
| 904 | BOTTLENECK CPU USE AMOUNT DETECTION THRESHOLD | 60% |
| 905 | BOTTLENECK CPU USE AMOUNT ELIMINATION THRESHOLD | 40% |
| 906 | BOTTLENECK MEMORY USE AMOUNT DETECTION THRESHOLD | 50% |
| 907 | BOTTLENECK MEMORY USE AMOUNT ELIMINATION THRESHOLD | 35% |
| 908 | BOTTLENECK TRANSACTION OCCURRENCE AMOUNT DETECTION THRESHOLD | 500 |
| 909 | BOTTLENECK TRANSACTION OCCURRENCE AMOUNT ELIMINATION THRESHOLD | 300 |
| 910 | CEILING POINT (CHILD PROCESSING GENERATION INDICATION VALUE) | 70% |

| | MODULE NAME | Module 2 |
|---|---|---|
| 901 | | |
| 902 | CPU ALLOCATION AMOUNT | 50% |
| 903 | MEMORY ALLOCATION AMOUNT | 50% |
| 904 | BOTTLENECK CPU USE AMOUNT DETECTION THRESHOLD | 50% |
| 905 | BOTTLENECK CPU USE AMOUNT ELIMINATION THRESHOLD | 25% |
| 906 | BOTTLENECK MEMORY USE AMOUNT DETECTION THRESHOLD | 50% |
| 907 | BOTTLENECK MEMORY USE AMOUNT ELIMINATION THRESHOLD | 30% |
| 908 | BOTTLENECK TRANSACTION OCCURRENCE AMOUNT DETECTION THRESHOLD | 300 |
| 909 | BOTTLENECK TRANSACTION OCCURRENCE AMOUNT ELIMINATION THRESHOLD | 100 |
| 910 | CEILING POINT (CHILD PROCESSING GENERATION INDICATION VALUE) | 60% |

FIG. 9

| | | |
|---|---|---|
| 1001 | MODULE NAME | Module 1 |
| 1002 | ACQUISITION INTERVAL | 10 MINUTES |
| 1003 | ACQUISITION TIME | 2003/3/1/12:00 |
| 1004 | TRANSACTION OCCURRENCE AMOUNT | 200 |
| 1005 | TRANSACTION PROCESSING AMOUNT | 100 |
| 1006 | CPU USE AMOUNT | 20% |
| 1007 | CPU ALLOCATION AMOUNT | 30% |
| 1008 | CPU PREDICATION USE AMOUNT | 30% |
| 1009 | MEMORY USE AMOUNT | 30% |
| 1010 | MEMORY ALLOCATION AMOUNT | 25% |
| 1011 | PREDICTED MEMORY USE AMOUNT | 20% |
| | | |
| 1003 | ACQUISITION TIME | 2003/3/1/12:10 |
| 1004 | TRANSACTION OCCURRENCE AMOUNT | 210 |
| 1005 | TRANSACTION PROCESSING AMOUNT | 120 |
| 1006 | CPU USE AMOUNT | 25% |
| 1007 | CPU ALLOCATION AMOUNT | 20% |
| 1008 | CPU PREDICATION USE AMOUNT | 22% |
| 1009 | MEMORY USE AMOUNT | 32% |
| 1010 | MEMORY ALLOCATION AMOUNT | 30% |
| 1011 | PREDICTED MEMORY USE AMOUNT | 35% |
| | | |
| | ABBREVIATION | |
| | | |

FIG. 10

| Label | Field | Value |
|---|---|---|
| 1003 | ACQUISITION TIME | 2003/3/1/15:00 |
| 1004 | TRANSACTION OCCURRENCE AMOUNT | 500 |
| 1005 | TRANSACTION PROCESSING AMOUNT | 120 |
| 1006 | CPU USE AMOUNT | 60% |
| 1007 | CPU ALLOCATION AMOUNT | 50% |
| 1008 | CPU PREDICTED USE AMOUNT | 50% |
| 1009 | MEMORY USE AMOUNT | 50% |
| 1010 | MEMORY ALLOCATION AMOUNT | 35% |
| 1011 | PREDICTED MEMORY USE AMOUNT | 40% |
| | | |
| 1003 | ABBREVIATION | |
| 1004 | | |
| 1005 | ACQUISITION TIME | 2003/3/1/18:00 |
| 1006 | TRANSACTION OCCURRENCE AMOUNT | 300 |
| 1007 | TRANSACTION PROCESSING AMOUNT | 250 |
| 1008 | CPU USE AMOUNT | 40% |
| 1009 | CPU ALLOCATION AMOUNT | 80% |
| 1010 | CPU PREDICTED USE AMOUNT | 80% |
| 1011 | MEMORY USE AMOUNT | 30% |
| | MEMORY ALLOCATION AMOUNT | 35% |
| | PREDICTED MEMORY USE AMOUNT | 30% |
| | | |
| | ABBREVIATION | |
| | | |
| 1003 | ACQUISITION TIME | 2003/3/1/23:50 |
| 1004 | TRANSACTION OCCURRENCE AMOUNT | 200 |
| 1005 | TRANSACTION PROCESSING AMOUNT | 180 |
| 1006 | CPU USE AMOUNT | 30% |
| 1007 | CPU ALLOCATION AMOUNT | 30% |
| 1008 | CPU PREDICTED USE AMOUNT | 25% |
| 1009 | MEMORY USE AMOUNT | 20% |
| 1010 | MEMORY ALLOCATION AMOUNT | 25% |
| 1011 | PREDICTED MEMORY USE AMOUNT | 20% |
| | | |
| | THE REST IS OMITTED | |

FIG. 11

| | | |
|---|---|---|
| 1201 | MODULE NAME | Module 1 |
| 1202 | CYCLE PERIOD | 1 DAY |
| 1203 | INTERVAL IN PERIOD | 1 HOUR |
| 1204 | TIME | 00:00 |
| 1205 | TRANSACTION OCCURRENCE AMOUNT | 150 |
| 1204 | TIME | 01:00 |
| 1205 | TRANSACTION OCCURRENCE AMOUNT | 120 |
| | ABBREVIATION | |
| 1204 | TIME | 23:00 |
| 1205 | TRANSACTION OCCURRENCE AMOUNT | 180 |
| | | |
| 1202 | CYCLE PERIOD | 1 WEEK |
| 1203 | INTERVAL IN PERIOD | 1 DAY |
| 1204 | TIME | SUNDAY |
| 1205 | TRANSACTION OCCURRENCE AMOUNT | 200 |
| 1204 | TIME | MONDAY |
| 1205 | TRANSACTION OCCURRENCE AMOUNT | 180 |
| | ABBREVIATION | |
| 1204 | TIME | SATURDAY |
| 1205 | TRANSACTION OCCURRENCE AMOUNT | 150 |
| | | |
| 1202 | CYCLE PERIOD | 1 MONTH |
| 1203 | INTERVAL IN PERIOD | 1 DAY |
| 1204 | TIME | 1 DAY |
| 1205 | TRANSACTION OCCURRENCE AMOUNT | 120 |
| 1204 | TIME | SECOND DAY |
| 1205 | TRANSACTION OCCURRENCE AMOUNT | 180 |
| | ABBREVIATION | |
| 1204 | TIME | THIRTY-FIRST DAY |
| 1205 | TRANSACTION OCCURRENCE AMOUNT | 150 |
| | | |

F I G. 1 2

| COMBINED DATA | |
|---|---|
| 1301 — CYCLE PERIOD | 1 MONTH |
| 1302 — INTERVAL IN PERIOD | 1 HOUR |
| 1303 — TIME | 1 DAY 0:00 |
| 1304 — TRANSACTION OCCURRENCE AMOUNT | 180 |
| 1303 — TIME | 1 DAY 1:00 |
| 1304 — TRANSACTION OCCURRENCE AMOUNT | 170 |
| ABBREVIATION | |
| 1303 — TIME | THIRTY-FIRST DAY 23:00 |
| 1304 — TRANSACTION OCCURRENCE AMOUNT | 120 |

FIG. 13

| | | |
|---|---|---|
| 1401 | MODULE NAME | Module 1 |
| 1402 | PREDICTED INTERVAL | 1 HOUR |
| 1403 | TIME | 2003/3/1 00:00 |
| 1404 | CPU USE AMOUNT PREDICTION | 45% |
| 1405 | TRANSACTION OCCURRENCE AMOUNT PREDICTION | 200 |
| 1403 | TIME | 2003/3/1 01:00 |
| 1404 | CPU USE AMOUNT PREDICTION | 43% |
| 1405 | TRANSACTION OCCURRENCE AMOUNT PREDICTION | 200 |
| | ABBREVIATION | |
| 1403 | TIME | 2003/3/12 03:00 |
| 1404 | CPU USE AMOUNT PREDICTION | 60% |
| 1405 | TRANSACTION OCCURRENCE AMOUNT PREDICTION | 500 |
| | ABBREVIATION | |
| 1403 | TIME | 2003/3/12 01:00 |
| 1404 | CPU USE AMOUNT PREDICTION | 40% |
| 1405 | TRANSACTION OCCURRENCE AMOUNT PREDICTION | 300 |
| | ABBREVIATION | |
| 1403 | TIME | 2003/3/31 23:00 |
| 1404 | CPU USE AMOUNT PREDICTION | 45% |
| 1405 | TRANSACTION OCCURRENCE AMOUNT PREDICTION | 200 |

F I G. 1 4

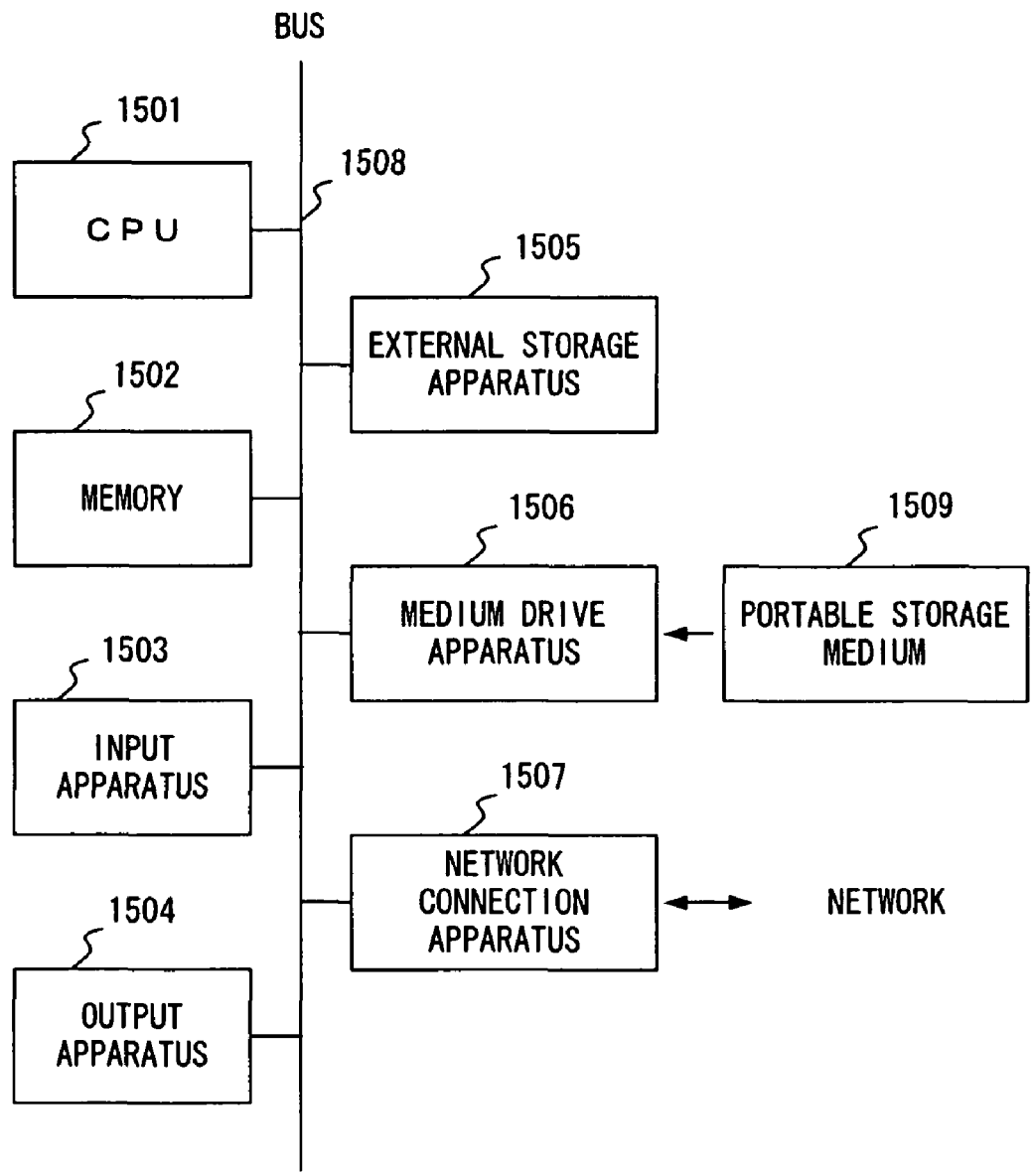
F I G. 15

APPARATUS FOR ADJUSTING USE RESOURCES OF SYSTEM AND METHOD THEREOF

BACKGROUND OF THE INVENTION

1. Field of the Invention

The present invention relates to an apparatus and a method of predicting the amount of computer resources to be used in the future by each module of a data processing system and autonomously adjusting the restriction of a use resource amount for each module.

2. Description of the Related Art

FIG. 1 shows a software module in a conventional data processing system. A module is an aggregate of application programs (operations) in a system and one module includes one or more applications.

In FIG. 1, a module 1 includes three applications of an operation 1, an operation 2 and an operation 3. A module 2 includes two applications of two operations. A module 3 includes an application of one operation.

In such a system, the exhaustion of resources used by an application can be avoided by establishing the restriction of a use resource amount for each module and controlling a resource amount so that the service can be realized at an available and predictable level (for example, refer to a non-patent document 1 and patent documents 1, 2, 3 and 4).
Non-patent document 1
"Solaris 9 Resource Manager", [online], Sun Microsystems-product & service-Sun ONE software-Solaris-Solaris 9-data sheet, [searched on Mar. 11, 2003] Internet<URL: http://jp.sun.com/software/solaris/ds/ds-srm/>
Patent document 1
Japanese patent application publication No. 2002-268,920
Patent document 2
Japanese patent application publication No. 2002-342,269
Patent document 3
Japanese patent application publication No. 2001-022,597
Patent document 4
Japanese patent application publication No. 10-124,333

However, there are following problems in the above-mentioned conventional resource amount control.

In the conventional resource amount control, restriction is set to the use resource amount of a module by corresponding the module to an application. In this way, a large allocation use resource amount is set to the application having a large use resource amount while a small use resource amount is set to the application having a small use resource amount. Thus, the exhaustion of resources used by an application can be avoided.

However, the use resource amount of each application is not constant and the amount varies depending on a minute, an hour, a week, etc. In addition, a use resource amount increases suddenly and each application sometime falls into a bottleneck. In order to correspond to such a change of a use resource amount, a system manager must monitor a use resource amount at any time and change the setting of restriction accordingly based on the situation.

Furthermore, a use resource amount is in proportion to a transaction processing amount but a use resource amount is not necessarily in proportion to a transaction occurrence amount. Therefore, the use resource amount for a future transaction occurrence amount cannot be predicted only by referring to the transition of a past use resource amount.

SUMMARY OF THE INVENTION

The object of the present invention is to offer a device and a method of accurately predicting the change of a use resource amount of each module and of autonomously adjusting the restriction of a use resource amount according to the change in a data processing system.

A resource adjustment apparatus of the present invention is provided with a storage device, a generation device and an allocation device, and adjusts for each module an amount of computer resources used in a system having a plurality of modules each including at least one application program.

The storage device stores data showing the transition of a past transaction occurrence amount for each of the plurality of modules. The generation device obtains data showing a transition of the transaction occurrence amount of a target module from the storage device and uses the transaction occurrence amount as a transaction processing amount in a function that shows a correlation between a past transaction processing amount and a use resource amount of a target module, and thereby generates the transition of a use resource amount from the transition of a transaction occurrence amount of the target module. The allocation device automatically fluctuates an allocation resource amount of the target module in accordance with a transition of a predicted use resource amount using the transition of the generated use resource amount as a transition of the predicted use resource amount.

BRIEF DESCRIPTION OF THE DRAWINGS

FIG. 1 is a block diagram showing a module;
FIG. 2 is a block diagram showing the principle of a resource adjustment apparatus of the present invention;
FIG. 3 is a flowchart of the processing in a surveillance operation mode;
FIG. 4A is a graph showing a transition of a past transaction occurrence amount;
FIG. 9 is an each-module basic data table;
FIG. 10 is an each-module statistics data table (No. 1);
FIG. 11 is an each-module statistics data table (No. 2);
FIG. 12 is an each-module cycle information data table (No. 1);
FIG. 13 is an each-module cycle information data table (No. 2);
FIG. 14 is an each-module resource prediction data table;
FIG. 15 is a configuration diagram of, a data processing apparatus.

DESCRIPTION OF THE PREFERRED EMBODIMENTS

Figure 4B:
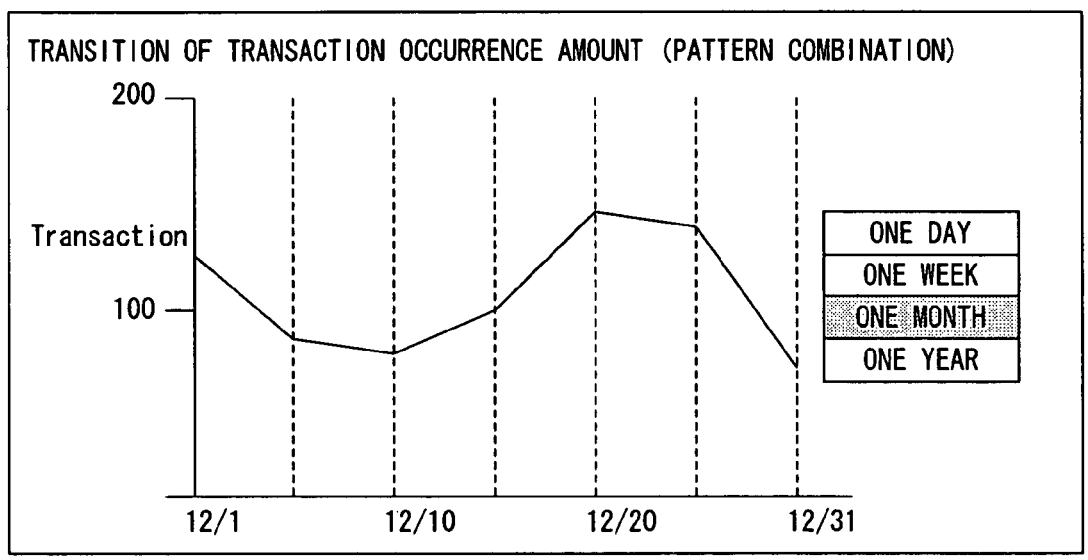
FIG. 4B is a graph showing a transition of a future transaction occurrence amount.

The preferred embodiments of the present invention is explained in detail by referring to the drawings. FIG. 2 is a block diagram showing the principle of a resource adjustment apparatus of the present invention. The resource adjustment apparatus of FIG. 2 includes a storage device 101, a generation device 102 and an allocation device 103. The apparatus, for each module, adjusts the amount of the computer resources that are used in a system having a plurality of modules each including one or more application program.

The storage device 101 stores the data that shows a transition of the past transaction occurrence amount for each of a plurality of modules. The generation device 102 obtains the data that shows the transition of the past transaction occurrence amount of a target module from the storage device 101 and uses the transaction occurrence amount as a transaction processing amount in the function that shows the correlation relation between the past transaction processing amount and the use resource amount of the target module. In this way, the generation device generates a transition of the use resource amount from a transition of the transaction occurrence amount of the target module. The allocation device 103 automatically fluctuates an allocation resource amount of the target module in accordance with the predicted transition of a use resource amount using the generated transition of a use resource amount as the predicted transition of a use resource amount.

The storage device 101 stores, for example, a measurement value of the transaction occurrence amount that is collected for each module. The generation device 102 obtains the measurement value of a transaction occurrence amount of the module to be adjusted (target module) from the storage device 101. Then, the generation device 102 substitutes the measurement value of a transaction occurrence amount for the function that shows a correlation between the past transaction processing amount and the use resource amount of the target module as a transaction processing amount. Thus, the generation device 102 calculates the transition of a use resource amount of a target module. Thereafter, the allocation device 103 automatically fluctuates the future allocation resource amount of the target module in accordance with the calculated transition of a use resource amount.

By applying the past transaction occurrence amount to the transaction processing amount and calculating the future use resource amount, a change of the use resource amount for each module can be accurately predicted. Furthermore, restriction of the use resource amount for each module can be autonomously fluctuated by changing an allocation resource amount in accordance with a transition of the predicted use resource amount.

The storage device 101 corresponds to, for example, an external storage apparatus 1505 of FIG. 15 that is described later. The generation device 102 and the allocation device 103 correspond to, for example, the combination of a CPU (Central Processing Unit) 1501 and a memory 1502 of FIG. 15.

In the present preferred embodiments, the restriction of a use resource amount is scheduled for each module so that the effective use of resources, the avoidance of a bottleneck of resources, the capacity planning support for a whole system, etc., are realized in a data processing system that can manage computer resources.

The resource adjustment apparatus accumulates measurement values of the transaction amount (occurrence amount·processing amount) and the use resource amount for each module that is related to each application, thereby obtaining the pattern (mean value or maximum value) of each cycle (for example, day, week, month) of a transaction occurrence amount. Then, the thus-obtained patterns of respective cycles are combined and a transition of the transaction occurrence amount in specific cycle units (for example, in month units) is calculated.

In addition, the resource adjustment apparatus obtains the approximate function that shows the relation between a transaction processing amount and a use resource amount, and applies the thus-obtained approximate function to the transition of a transaction occurrence amount in month units, thereby obtaining a transition of the predicted use resource amount in month units. The approximate function here can be obtained by generalizing the approximation of a real number that is generally used. In other words, it is thought that an approximate function, with specific accuracy, represents the amount that depends upon a single parameter or a plurality of parameters if the approximate value of a real number represents a certain mathematical amount with specific digit accuracy.

By scheduling the future use resource amount in this way, restriction of the use resource amount for each module can be fluctuated automatically and accurately.

Furthermore, the resource adjustment apparatus sets up the bottleneck detection threshold for each module. In the case that a use resource amount reaches the threshold, the resources are preferentially allocated to the module. In this way, a bottleneck can be removed.

An operation mode of the resource adjustment apparatus is generally divided into two modes such as a surveillance or monitored operation mode and an autonomous operation mode. The resource adjustment apparatus schedules the resource amount required for each module and performs the operation designed for a server.

In the surveillance operation mode, a manager (operator) can change the scheduled resource amount and the resource adjustment apparatus adjusts a resource amount in accordance with the schedule that is finally decided by a manager. In the autonomous operation mode, the resource adjustment apparatus collects statistics information regarding a transaction amount and a use resource amount in module units, and automatically judges the situations of modules, thereby adjusting the resource allocation for each module.

FIG. 3 is a flowchart of processings in the surveillance operation mode. First of all, the resource adjustment apparatus collects statistics information about a transaction amount (occurrence amount·processing amount) and a use resource amount in module units (step 201). The statistics information is periodically collected and accumulated.

Then, the resource adjustment apparatus calculates an allocation resource amount in module units (necessary resource amount) from the collected statistics information and presents the schedule of the allocation resource amount to a manager (step 202).

Here, a transition of the transaction occurrence amount for each cycle (day, week, month, etc.) and the transitions of a mean value and a maximum value of the transaction occurrence amount regarding a plurality of modules in a system are firstly obtained from the transaction occurrence amount that is accumulated in the past and the thus-obtained transitions are presented to a manager. Then, a manager instructs the combination of transitions of transactions by selecting the mean value or maximum value for each cycle.

At this time, the resource adjustment apparatus displays, for example, a screen like FIG. 4A on a display. On the screen of FIG. 4A, one day is selected as a cycle and three days are selected as the period used for a statistics processing.

Line graphs 301, 302 and 303 show transitions of the transaction occurrence amounts of a certain module on December 1, 2 and 3, respectively. A Line graph 304 shows a transition of the mean value of a transaction occurrence amount in these three days while a line graph 305 shows a transition of the maximum value of a transaction occurrence amount in these three days. A manager selects the displayed mean value or maximum value (MAX value) using a pointing device such as a mouse, etc. If an operation terminates, a manager clicks an OK button 306.

In the same way, a manager selects the mean values or maximum values regarding the other cycles and the resource adjustment apparatus combines/calculates a transition of the transaction occurrence amount to be predicted in the future by superposing selected transitions (pattern) of the respective selected cycles.

In this way, a screen like, for example, FIG. 4B is displayed. On the screen of FIG. 4B, a transition of the future transaction occurrence amount regarding a "month" in which the patterns of each cycle of a "day" and a "week" are added or combined is calculated.

Then, the resource adjustment apparatus generates an approximate function that shows the correlation between a transaction processing amount and a use resource amount, in the past. For example, in the case that an exponential function is used as an approximate function, the following approximate expression is generated while A, B and C are set as constant numbers.

$$\text{(Use resource amount)} = A*(\text{transaction processing amount})^B + C$$

Figure 5:
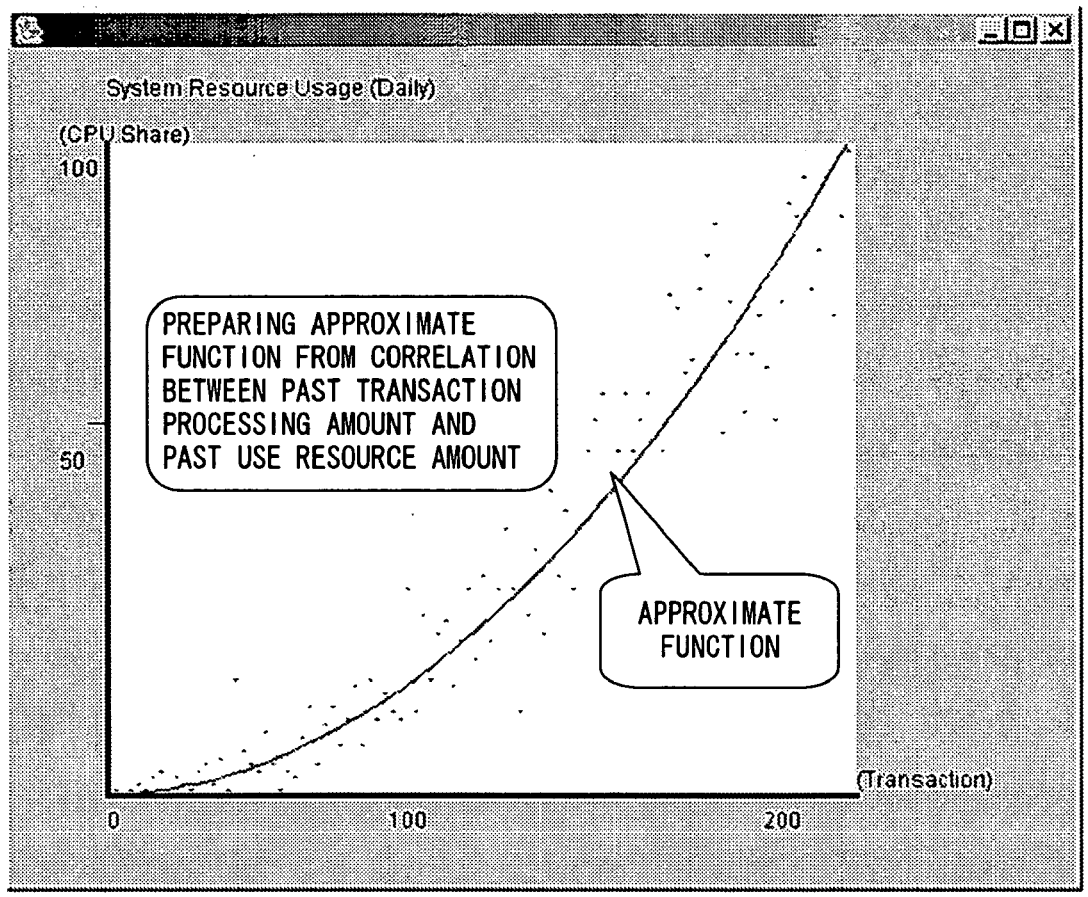
FIG. 5 is a graph showing an approximate function.

In this way, a screen like, for example, FIG. 5 is displayed. A horizontal axis of the screen of FIG. 5 expresses a transaction processing amount while a vertical axis expresses a use resource amount.

Figure 6:
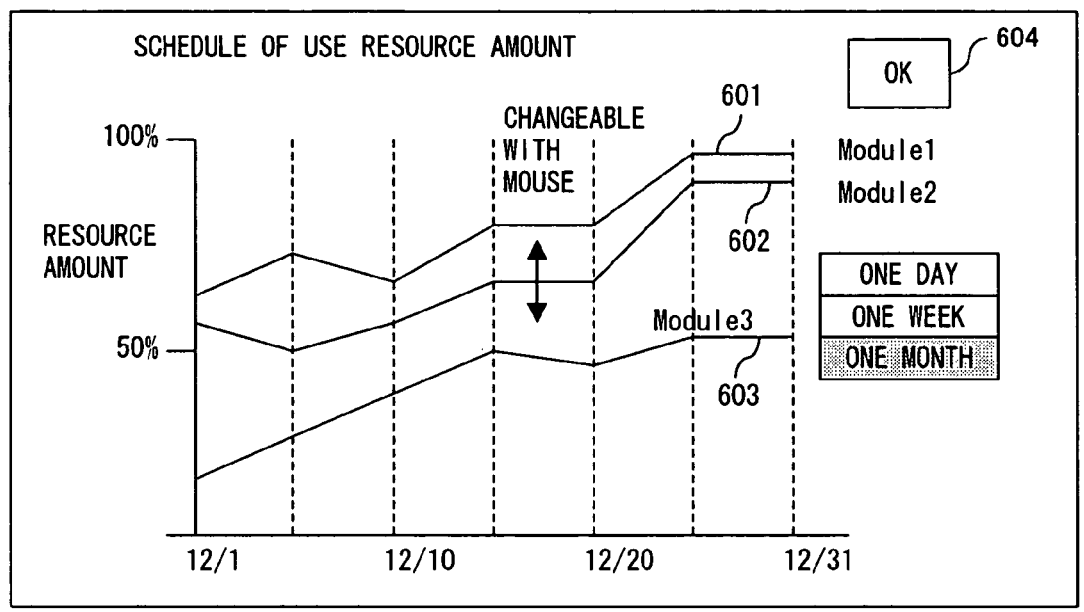
FIG. 6 is a graph showing a schedule of a use resource amount.

Then, the schedule of a future use resource amount is calculated based on this approximate function and the transition of a future transaction occurrence amount and the schedule is presented to a manager. Thus, a screen like, for example, FIG. 6 is displayed. On the screen of FIG. 6, line graphs 601, 602 and 603 are displayed as the schedule of a future use resource amount regarding a "month". The line graphs 601, 602 and 603 represent the schedules of modules #1, #2 and #3, respectively.

A manager can change the setting of the thus-represented schedule of a use resource amount as occasion demands (step 203). A manager changes a schedule, for example, by dragging a line graph up and down using a pointing device on a screen (step 204). When an operation terminates, an OK button 604 is clicked.

The resource adjustment apparatus automatically fluctuates a future allocation resource amount in accordance with the calculated schedule in the case that a schedule is not changed while the apparatus automatically fluctuates the amount in accordance with the changed schedule in the case that a schedule is changed (step 205).

Then, the resource adjustment apparatus monitors the subsequent allocation situation of resources, compares the predicted·set allocation resource amount with the actually-used resource amount and presents the comparison results to a manager (step 206). A manager can perform a mode change from the surveillance operation mode to the autonomous operation mode in the case that an allocation resource amount and a use resource amount are suitable for an operation system.

Figure 7:
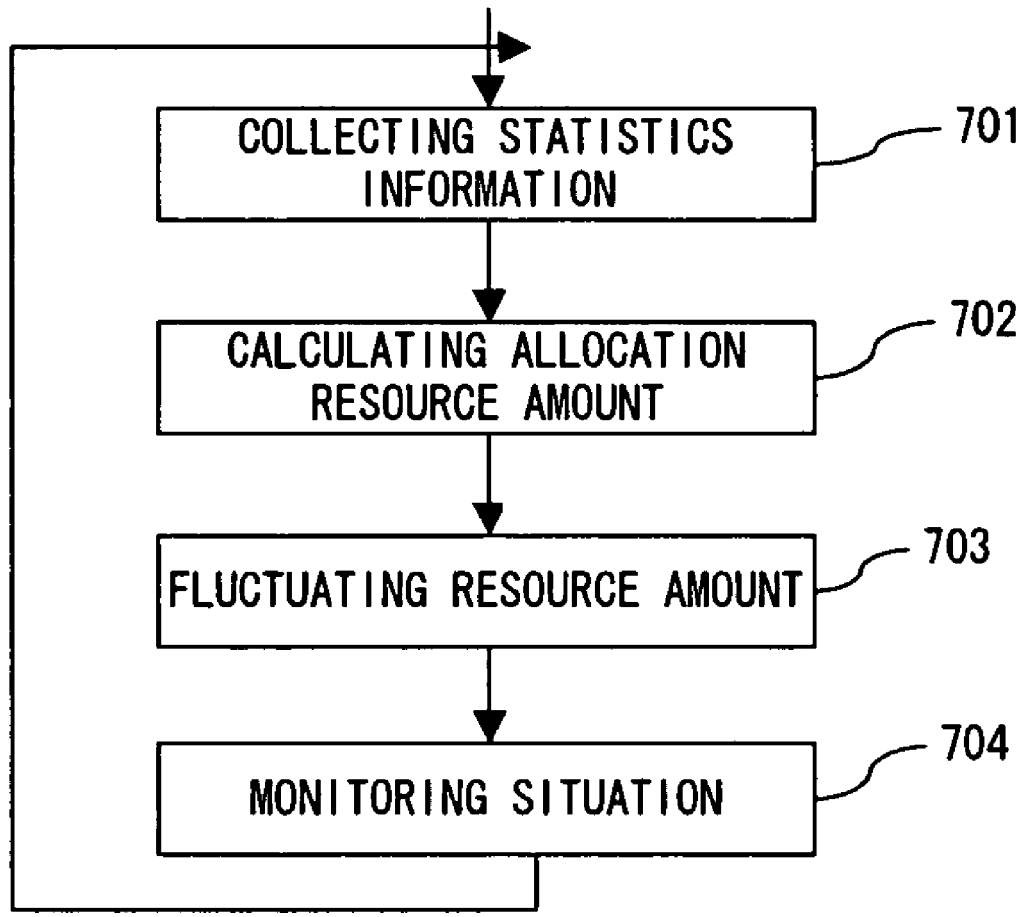
FIG. 7 is a flowchart of a processing in an autonomous operation mode.

FIG. 7 is a flowchart of the processing of the autonomous operation mode. The processing in step 701 of FIG. 7 is identical to that in step 201 of FIG. 2. The resource adjustment apparatus calculates an allocation resource amount in module units based on the collected statistics information (step 702).

First of all, the resource adjustment apparatus predicts a transaction occurrence amount in the next time unit (for example, an initial value is one hour) from the transaction occurrence amount that was accumulated in the past. Then, similarly to the case of the surveillance operation mode, the resource adjustment apparatus generates an approximate function that shows the correlation between a past transaction processing amount and a past use resource amount. Then, from the predicted transaction occurrence amount and the approximate function, the resource adjustment apparatus calculates the resource amount that is required for the next time unit.

After that, the resource adjustment apparatus sets the calculated resource amount as an allocation resource amount (step 703) and monitors the subsequent allocation situation of resources (step 704). Then, the resource adjustment apparatus compares the predicted·set up allocation resource amount with the actually-used resource amount and presents the comparison results to a manager.

In the autonomous operation mode, an allocation resource amount is automatically adjusted differently from in the surveillance operation mode even if a manager does not change the allocation resource amount. In the case that the allocation resource amount and the use resource amount are not suitable for an operation system, a manager can change a mode from the autonomous operation mode to the surveillance operation mode.

Figure 8:
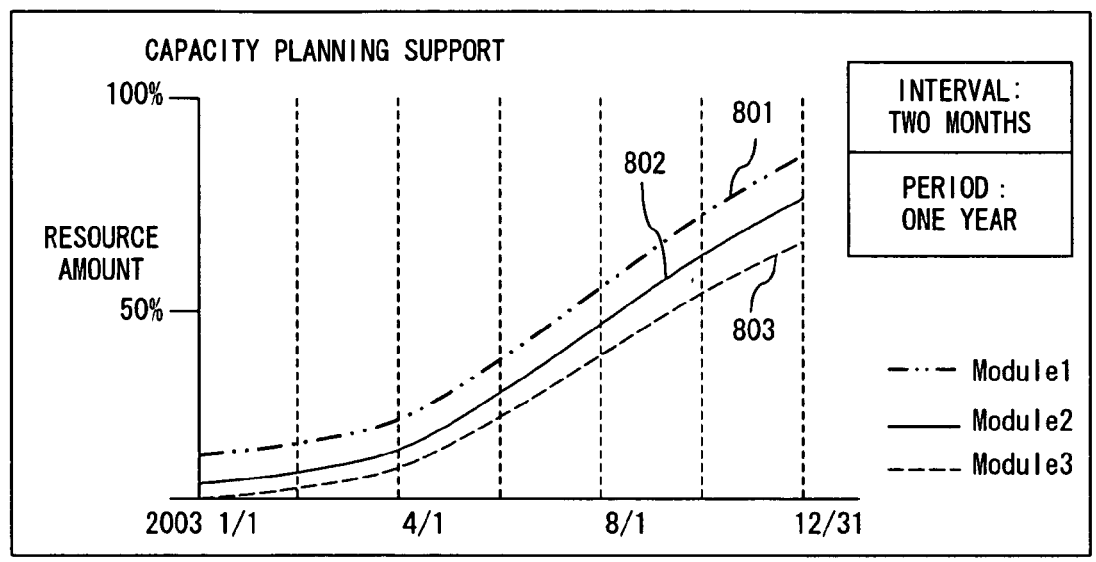
FIG. 8 is a graph showing capacity planning support.

Furthermore, the resource adjustment apparatus can perform the future long-term resource amount prediction of each module. For example, in the case that the use resource amount for one year is predicted at intervals of two months, the schedule like FIG. 8 is displayed on a screen. Curves 801, 802 and 803 of FIG. 8 show the schedules of use resource amounts of modules #1, #2 and #3, respectively.

When the use resource amounts that are predicted for all the modules in a system are added and the schedule is displayed as a graph, a total demand of the whole system can be presented to a manager and the support for capacity planning can be realized.

The following is the detailed explanation of the processings performed by the resource adjustment apparatus. The resource adjustment apparatus performs a resource adjustment processing using such tables shown in, for example, FIGS. 9 to 14.

Data of the following items is stored for each module in an each-module basic data table of FIG. 9.
Module name 901 (module distinction information)
CPU allocation amount 902
Memory allocation amount 903
Bottleneck CPU use amount detection threshold value 904
Bottleneck CPU use amount elimination threshold value 905
Bottleneck memory use amount detection threshold value 906
Bottleneck memory use amount elimination threshold value 907
Bottleneck transaction occurrence amount detection threshold value 908
Bottleneck transaction occurrence amount elimination value 909
Ceiling point 910 (child processing generation instruction value)

The basic data of Module 1 and Module 2 are shown in FIG. 9.

Data of the following items are stored for each module in an each module statistics data table of FIGS. 10 and 11.
Module name 1001 (module distinction information)
Acquisition interval 1002: (time interval for obtaining statistics data: variable)
Acquisition time 1003
Transaction occurrence amount 1004
Transaction processing amount 1005
CPU use amount 1006
CPU allocation amount 1007
Predicted CPU use amount 1008
Memory use amount 1009

Memory allocation amount 1010
Predicted memory use amount 1011

Among these, the data of items 1003~1011 are repeatedly stored at each acquisition time. In FIGS. 10 and 11, the statistics data of a module 1 are obtained every 10 minutes and the data at five times on Mar. 1, 2003 are exemplified.

The data of the following items are stored for each module in an each-module cycle information data table of FIGS. 12 and 13.
Module name 1201 (module distinction information)
Cycle period 1202
Interval within a period 1203
Time 1204
Transaction occurrence amount 1205
Cycle period 1301
Interval within period 1302
Time 1303
Transaction occurrence amount 1304

Among these items, data of the items 1202 to 1205 are repeatedly stored for each cycle designated by the cycle period 1202. Data of the items 1204 and 1205 are repeatedly stored at every time interval designated by the interval 1203 within a period.

Furthermore, data of the items 1301 to 1304 show data obtained by combining the data of a plurality of cycles. The longest cycle period 1202 is set as the cycle period 1301 while the interval within period 1203 of the shortest cycle period 1202 is set as the interval within period 1302. Data of the items 1303 and 1304 are repeatedly stored every time of a time interval designated by the interval within period 1302.

In FIG. 12, a transaction occurrence amount of the Module 1 is indicated at every time interval within a period regarding each cycle such as one day, one week and one month. FIG. 13 shows combination data of the transaction occurrence amounts for one month.

Data of the following items are stored for each module in an each-module resource prediction data table of FIG. 14.
Module name 1401 (module distinction information)
Predicted interval 1402 (time interval of prediction data: variable)
Time 1403
CPU use amount prediction 1404
Transaction occurrence amount prediction 1405

Among these items, data of the items 1403 to 1405 are repeatedly stored at every time interval designated by the prediction interval 1402. In FIG. 14, resource prediction data of the Module 1 is generated every one hour.

First of all, the resource adjustment apparatus sets the data of an each-module basic data table of FIG. 9 in accordance with the instructions from a manager. Then, the resource adjustment apparatus accumulates, for each acquisition interval, the transaction amount for each module (occurrence amount·processing amount) and the use amount, the allocation amount and the prediction use amount of a CPU and a memory in the each-module statistics data table of FIGS. 10 and 11. In the following explanation, a CPU use amount is paid attention to as a use resource amount.

As shown in FIG. 4A, a transaction occurrence amount in the past is displayed for each cycle (day, week, month etc.). Furthermore, the mean value and the maximum value are calculated and displayed. When a manager selects the mean value or the maximum value for each cycle, the selected value is stored in an each-module cycle information data table of FIG. 12.

After that, by adding or combining the transitions of transaction occurrence amounts of a "week" and a "day" for the transition of a transaction occurrence data of a "month" and combining these transitions, a transition of the transaction occurrence amount of a "month" is calculated as shown in FIG. 4B and the calculated data are stored as the combination data of FIG. 13. The combination data become prediction data of the transaction occurrence amount.

Furthermore, a manager can select the type of a cycle to be used for the generation of combination data. The resource adjustment apparatus generates combination data using only a transaction occurrence amount of the selected cycle. For example, in the case that a manager selects only a cycle of a "day" and instructs the prediction of a transition of the transaction occurrence amount of a "month", the resource adjustment apparatus predicts a transition of the transaction occurrence amount of a "month" using a method of repeatedly coping with a transition of the transaction occurrence amount of a "day", etc.

After that, the approximate function as shown in FIG. 5 and the following equation or function are obtained from the relation between a past transaction processing amount and a past CPU use amount in the each-module statistics data table.

$$(\text{CPU use amount}) = A * (\text{transaction processing amount})^B + C$$

Then, the resource adjustment apparatus substitutes a transaction occurrence amount of the combination data for a "month" that is stored in an each-module cycle information data table for the transaction processing amount of an approximate function, thereby calculating a transition of the predicted CPU use amount of a "month".

Subsequently, the future predicted CPU use amount is scheduled as shown in FIG. 6 and stored in an each-module resource prediction data table of FIG. 14 as a CPU use amount prediction. Furthermore, the predicted transaction occurrence amount is stored in the each-module resource prediction data table as a transaction occurrence amount prediction. After that, data of the CPU use amount prediction is written as past data in the item of a CPU prediction use amount in the each-module statistics data table.

Furthermore, a CPU allocation amount in the each-module statistics data table is calculated using data of the CPU use amount prediction. Generally, a CPU allocation amount is equal to a CPU prediction use amount (=CPU use amount prediction).

Such a process can accurately restrict the future use resource amount for each module by performing an addition of each-cycle use resource amounts and it can automatically fluctuate an allocation resource amount. Therefore, a resource amount of the whole system can be easily controlled.

In the schedule of a use resource amount calculated by the resource adjustment apparatus, a manager can flexibly change the setting of the restriction on a future resource amount by changing the transition of a use resource amount based on the past experience, etc. By enabling such a changing operation, exact control can be performed for the resource amount fluctuation (for example, a use resource amount on the special day of an enterprise) that cannot be predicted only by the past cycle.

For example, in the case that FIG. 6 shows the schedule of a CPU use amount of a "month", a manager can change the prediction value of a CPU use amount for each module by transforming a line graph. The changed result is stored as CPU use amount prediction in the each-module resource prediction data table of FIG. 14. In this case, a CPU prediction use amount is not equal to a CPU allocation amount at the corresponding acquisition time in the each-module statistics data table of FIGS. 10 and 11 (for example, the data of 2003/3/1/12:10 of FIG. 10).

In addition, the resource adjustment apparatus obtains a prediction value of the immediately-after transaction occurrence amount from a measurement value of the most-recent transaction occurrence amount and it may predict the immediately-after use resource amount using the prediction value and the approximate function.

In this way, the apparatus can automatically set the securer restriction on a future resource amount.

In the above-mentioned example, a future transaction occurrence amount is predicted. Sometimes, however, a great amount of transactions that cannot be predicted from the past data may suddenly occur. Thereupon, the resource adjustment apparatus obtains the most-recent (for example, past one hour) transaction occurrence amount from the each-module statistics data table of FIGS. 10 and 11, and generates the transition of a transaction occurrence amount based on the thus-obtained transaction amount is added.

Then, the resources adjustment apparatus applies the above-mentioned approximate function to the transition of a transaction occurrence amount to which the most-recent transaction occurrence amount is added, predicts the immediately-after CPU use amount (for example, one hour from now on) and rewrites a CPU use amount prediction in the each-module resources prediction data table of FIG. 14.

According to such a prediction method, the apparatus can predict the use resource amount closer to the present point using the most-recent transaction occurrence amount. Therefore, even in the case that a transaction occurrence amount suddenly increases, the apparatus can perform an exact control of the use resource amount.

If the bottleneck detection threshold of use resource amount allocation is set for each module as shown in FIG. 9, the apparatus can allot the resources of the other modules when the use resource amount of a certain module reaches the set threshold. This processing continues until the use resource amount reaches a bottleneck elimination threshold.

By preferentially allocating resources to a module of which the use resource amount reaches a certain value, a bottleneck can be avoided. In this way, for example, the extreme response delay of an application is prevented, thereby effectively utilizing a resource amount of the whole system.

A case (2003/3/1/15:00) such that in the each-module statistics data table of FIGS. 10 and 11, the most-recent CPU use amount of the Module 1 reaches a bottleneck CPU use amount detection threshold (60%) in the each-module basis data table of FIG. 9, is explained as an example. In this case, the resource adjustment apparatus sets a future CPU use amount prediction of the Module 1 large (for example, 80%) while it sets the CPU use amount prediction of the other module small (for example, 20%) by rewriting the each-module resource prediction data table of FIG. 14.

After that, when a CPU use amount of the Module 1 reaches a bottleneck CPU use amount elimination threshold (40%) in the each-module basic data table (2003/3/1/18:00), the resource adjustment apparatus restores the CPU use amount prediction of each module in the each-module resource prediction data table.

In this example, the resource adjustment apparatus takes measures against a bottleneck using a bottleneck CPU use amount detection threshold and a bottleneck CPU use amount elimination threshold. However, the bottleneck countermeasures are not required if a transaction occurrence amount and a transaction processing amount are almost the same even if a CPU use amount increases.

Even in the case that a certain module exhausts an allocation resource amount in this way, the module does not always run short of resources. Therefore, it cannot be determined whether or not the resources of the other modules should be really allocated to the certain module only by using a bottleneck detection threshold of the use resource amount allocation.

Thereupon, it is conceivable to use a transaction occurrence amount (for example, processing queue length) as a bottleneck detection threshold and a bottleneck elimination threshold. For example, by using a processing queue length as a threshold, a situation of the actual shortage of resources can be detected, thereby enabling the allocation of resources in emergencies. In this way, the system operation can be continued without taking the resources of the other modules until the stagnation of a processing of the certain module occurs. As a result, a resource amount of the whole system is effectively utilized.

Such a case (2003/3/1/15:00) that in the each-module statistics data table of FIGS. 10 and 11, the most-recent transaction occurrence amount of the Module 1 reaches a bottleneck transaction occurrence detection threshold (500) in the each-module basis data table of FIG. 9 is explained as an example. In this case, the resource adjustment apparatus sets the future CPU use amount prediction of the Module 1 large (for example, 80%) while it sets the CPU use amount prediction of the other module small (for example, 20%) by rewriting the each-module resource prediction data table of FIG. 14.

After that, when the transaction occurrence amount of the Module 1 reaches a bottleneck transaction occurrence elimination threshold (300) in an each-module basis data table (2003/3/1/18:00), the resource adjustment apparatus restores the CPU use amount prediction of each module in the each-module resource prediction data table.

The simultaneous use of a bottleneck CPU use amount detection/elimination threshold and a bottleneck transaction occurrence amount detection/elimination threshold in the each-module basis data table generates confusion. Therefore, it is desirable to select and use either one in consideration of the characteristic of each module.

Further, the resource adjustment apparatus predicts the long-term (future) total demand of all the modules as shown in FIG. 8 and displays the predicted results on the screen of a graphical user interface (GUI). Therefore, the apparatus can support the capacity planning made by a manager. A manager can appropriately carry out the constitution change of a use system etc. by referring to the presented total demand.

In this case, the resource adjustment apparatus obtains the transaction occurrence amount in the each-module statistics data table of FIGS. 10 and 11 for a long time (for example, from several months to one year) and generates an approximate function that shows a relation between the transaction processing amount and the resource amount during that period.

Then, the resource adjustment apparatus uses a transition of the obtained transaction occurrence amount as a prediction transition, applies an approximate function to this prediction transition and predicts the future long-term (for example, one to two years) use resource amount. Then, the apparatus calculates a total demand of the whole system by summing up the prediction results of all the modules and presents the calculated total demand to a manager.

In this way, in the case of capacity planning support, the prediction is carried out using the data of a transaction occurrence amount that has been obtained for a long period of time instead of the combination data of transaction occurrence amounts.

Furthermore, in the case that a prediction value of the use resource amount of a certain module increases, the resource adjustment apparatus can advise an application in the certain module to generate a child processing, etc. By advising the application to perform such a processing, the application can rapidly respond to the reduction of a processing queue transaction amount.

Among applications, some applications have such points that the transaction processing amounts do not increase no matter how many use resources are given since the number of processings is small. Thereupon, a use resource amount of the point is set as a ceiling point in the each-module basic data table of FIG. 9.

In the case that the most-recent CPU use amount prediction of the corresponding module in the each-module resource prediction data table of FIG. 14 reaches the ceiling point in an each-module basic data table, the resource adjustment apparatus gives the corresponding module instructions to generate a child processing, etc. If an application of the instructed module generates a child processing, the transaction processing amount increases since the number of transactions that can be simultaneously processed increases.

In the case that there are a plurality of applications in which such phenomena occur, notifications to these applications can be effectively performed if an aggregate of these applications is managed as one module.

In the above-mentioned preferred embodiment, a CPU is mainly handled as a resource. A resource adjustment apparatus or method of the present invention, however, is applicable to the optional computer resources including a memory, a disk region, a data transfer bandwidth, etc.

Meanwhile, a resource adjustment apparatus of FIG. 2 can be configured using, for example, a data processing apparatus (computer) as shown in FIG. 15. A data processing apparatus of FIG. 15 includes the CPU (Central Processing Unit) 1501, the memory 1502, an input apparatus 1503, an output apparatus 1504, the external storage apparatus 1505, a medium drive apparatus 1506 and a network connection apparatus 1507. These apparatuses are mutually connected by a bus 1508.

The memory 1502 includes, for example, a ROM (Read Only Memory), a RAM (Random Access Memory), etc., and stores programs and data to be used for processing. The CPU 1501 performs necessary processing by carrying our a program utilizing the memory 1502. The various types of tables shown in FIGS. 9 to 14 correspond to the data stored in the memory 1502.

The input apparatus 1503 includes, for example, a keyboard, a pointing device, a touch panel, etc. that are used for the input of instructions and information from an operator. The output device 1504 includes, for example, a display, a printer, a speaker, etc., that are used for the inquiry or the output of processing results to an operator.

The external storage apparatus 1505 includes, for example, a magnetic disk apparatus, an optical disk apparatus, a magneto optical disk apparatus, a tape apparatus, etc. The data processing apparatus stores the above-mentioned programs in the external storage apparatus 1505 and uses these by loading these into the memory 1502 as occasion demands. The external storage apparatus 1505 is also used to store the various types of tables shown in FIGS. 9 to 14.

The medium drive apparatus 1506 drives a portable storage medium 1509 and accesses the record contents. The portable record medium 1509 is an optional computer-readable storage medium including a memory card, a flexible disk, a CD-ROM (Compact Disk Read Only Memory), an optical disk, a magneto-optical disc, etc. An operator stores the above-mentioned programs and data in the portable storage medium 1509 and uses them after loading them into the memory 1502 as occasion demands.

The network connection apparatus 1507 is connected to optional communication networks such as a LAN (Local Area Network), the Internet, etc. and transforms data during communications. The data processing apparatus receives the above-mentioned programs and data from an external apparatus through the network connection apparatus 1507 as occasion demands and loads them into the memory 1502 to be used.

Figure 16:
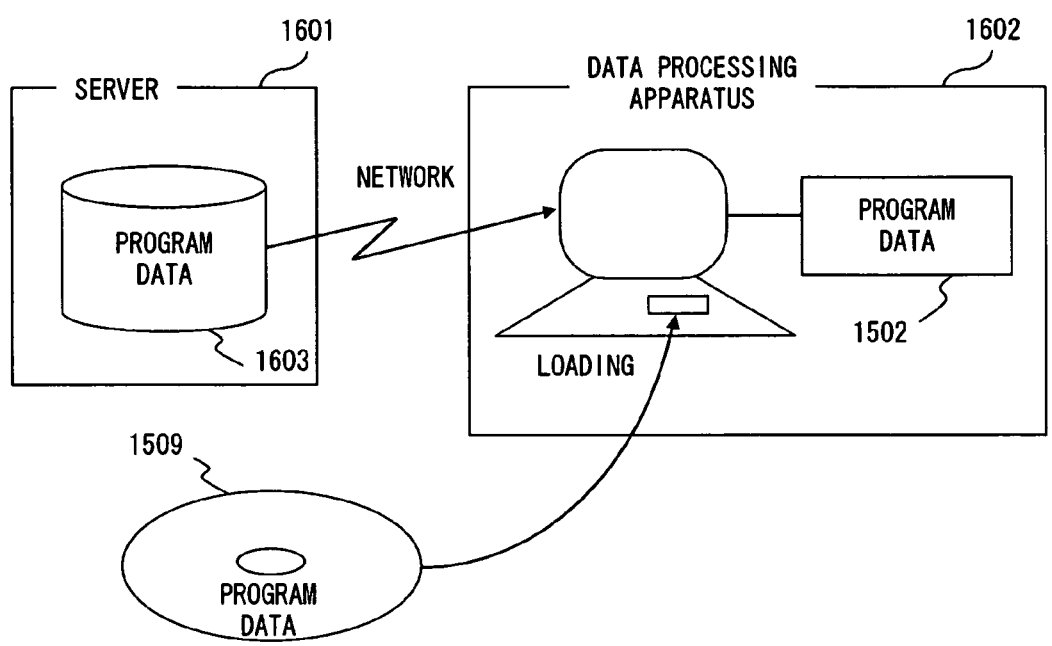
FIG. 16 is a block diagram showing a storage medium.

FIG. 16 shows a computer-readable storage medium for supplying a program and data to the data processing apparatus of FIG. 15. The program and data stored in a database 1603 of the portable storage medium 1509 and a server 1601 are loaded into the memory 1502 of a data processing apparatus 1602. The server 1601 generates a conveyance signal for conveying the programs and data, and transmits them to the data processing apparatus 1602 through an optional transmission medium on the network. The CPU 1501 carries out the programs using the data and performs the necessary processings.

According to the present invention, restriction on the use resource amount for each module can be autonomously and accurately fluctuated by predicting a future use resource amount from the measurement value of a transaction occurrence amount.

What is claimed is:

1. A resource adjustment apparatus for adjusting an amount of computer resources used in a system having a plurality of modules each comprising at least one application program, the resource adjustment apparatus comprising:

a storage device that stores data representing a past transaction amount and an amount of resources of a module used in the past over a period of time, for the plurality of modules, the past transaction amount includes a past transaction occurrence amount indicating an amount of transactions that occurred in the past and a past transaction processing amount indicating an amount of transactions processed in the past;

a generation device that performs an operation including:
  obtains past transaction occurrence amount of a target module from the storage device,
  generates transitions of a transaction occurrence amount of the target module for each of a plurality of different cycles based on obtained past transaction occurrence amount of the target module, the transitions of the transaction occurrence amount representing a plurality of amounts of transactions occurring at a plurality of days or times in each of the plurality of different cycles,
  generates a predicted transition of transaction occurrence amount of the target module in a specific cycle unit by combining the generated transitions corresponding to two or more different cycles selected among a plurality of cycles,
  generates an approximate function that expresses a correlation between a transaction processing amount indicating an amount of transactions to be processed and a required resource amount, based on correspondence between the past transaction processing amount and the amount of resource used in the past corresponding to the target module stored in the storage device, and
  generates a predicted transition of the required resource amount by substituting the transaction occurrence amount of the target module corresponding to the predicted transition of transaction occurrence amount for the transaction processing amount of the approximate function; and an allocation device that fluctuates an allocation resource amount of the target module in accordance with the predicted transition of the required resource amount.

2. A computer-readable storage medium storing a program for a computer adjusting an amount of computer resources used in a system having a plurality of modules each including at least one application program, wherein the program causes the computer to perform an operation, comprising:

obtaining past transaction occurrence amount of a target module from a storage device that stores data representing a past transaction amount and an amount of resources of a module used in the past over a period of time, for the plurality of modules, the past transaction amount includes a past transaction occurrence amount indicating an amount of transactions that occurred in the past and a past transaction processing amount indicating an amount of transactions processed in the past;

generating transitions of a transaction occurrence amount of the target module for each of a plurality of different cycles based on obtained past transaction occurrence amount of the target module, the transitions of the transaction occurrence amount representing a plurality of amounts of transactions occurring at a plurality of days or times in each of the plurality of different cycles;

generating a predicted transition of transaction occurrence amount of the target module in a specific cycle unit by combining the generated transitions corresponding to two or more different cycles selected among a plurality of cycles;

generating an approximate function that expresses a correlation between a transaction processing amount indicating an amount of transactions to be processed and a required resource amount, based on correspondence between the past transaction processing amount and the amount of resource used in the past corresponding to the target module stored in the storage device;

generating a predicted transition of the required resource amount by substituting the transaction occurrence amount of the target module corresponding to the predicted transition of transaction occurrence amount for the transaction processing amount of the approximate function; and fluctuating an allocation resource amount of the target module in accordance with the predicted transition of the required resource amount.

3. The storage medium according to claim 2, wherein the program causes the computer to perform:

displaying the predicted transition of the required resource amount on a screen; and when the operator changes the displayed transition of the required resource amount, using the changed transition of the required resource amount as the predicted transition of the required resource amount.

4. The storage medium according to claim 2, wherein the program causes the computer to perform:

obtaining a most-recent transaction occurrence amount of the target module from the storage device;

using a predicted transition of the required resource amount generated by the most-recent transaction occurrence amount as a predicted transition of an immediately-after required resource amount; and fluctuating an allocation of immediately-after resource amount of the target module.

5. The storage medium according to claim 2, wherein the program causes the computer to perform:

preferentially allocating resources to the target module during a period after a required resource amount of the target module reaches a predetermined bottleneck detection threshold until a required resource amount of the target module reaches a bottleneck elimination threshold.

6. The storage medium according to claim 2, wherein the program causes the computer to perform:

preferentially allocating resources to the target module during a period since a transaction occurrence amount of the target module reaches a predetermined bottleneck detection threshold until a transaction occurrence amount of the target module reaches a bottleneck elimination threshold.

7. The storage medium according to claim 2, wherein the program causes the computer to perform:

instructing the target module to generate a child processing when a required resource amount of the target module reaches a predetermined amount.

8. The storage medium according to claim 2, wherein the program causes the computer to perform:

displaying a screen for capacity planning support including a predicted transition of the required resource amount that is predicted for a long time.

9. A resource adjusting method adjusting an amount of computer resources used in a system having a plurality of modules each comprising at least one application program, the resource adjusting method comprising:

obtaining past transaction occurrence amount of a target module from a storage device that stores data representing a past transaction amount and an amount of resources of a module used in the past over a period of time, for the plurality of modules, the past transaction amount includes a past transaction occurrence amount indicating an amount of transactions that occurred in the past and a past transaction processing amount indicating an amount of transactions processed in the past;

generating transitions of a transaction occurrence amount of the target module for each of a plurality of different cycles based on obtained past transaction occurrence amount of the target module, the transitions of the transaction occurrence amount representing a plurality of amounts of transactions occurring at a plurality of days or times in each of the plurality of different cycles;

generating a predicted transition of transaction occurrence amount of the target module in a specific cycle unit by combining the generated transitions corresponding to two or more different cycles selected among a plurality of cycles;

generating an approximate function that expresses a correlation between a transaction processing amount indicating an amount of transactions to be processed and a required resource amount, based on correspondence between the past transaction processing amount and the amount of resource used in the past corresponding to the target module stored in the storage device;

generating a predicted transition of the required resource amount by substituting the transaction occurrence amount of the target module corresponding to the predicted transition of transaction occurrence amount for the transaction processing amount of the approximate function; and fluctuating an allocation resource amount of the target module in accordance with the predicted transition of the required resource amount.

10. A resource adjustment apparatus for adjusting an amount of computer resources used in a system having a plurality of modules each comprising at least one application program, the resource adjustment apparatus comprising:

a storage means for storing data representing a past transaction amount and an amount of resources of a module used in the past over a period of time, for the plurality of modules, the past transaction amount includes a past transaction occurrence amount indicating an amount of transactions that occurred in the past and a past transaction processing amount indicating an amount of transactions processed in the past;

a generation means for obtaining past transaction occurrence amount of a target module from the storage means, generating transitions of a transaction occurrence amount of the target module for each of a plurality of different cycles based on obtained past transaction occurrence amount of the target module, the transitions of the transaction occurrence amount representing a plurality of amounts of transactions occurring at a plurality of days or times in each of the plurality of different cycles, generating a predicted transition of transaction occurrence amount of the target module in a specific cycle unit by combining the generated transitions corresponding to two or more different cycles selected among a plurality of cycles, generating an approximate function that expresses a correlation between a transaction processing amount indicating an amount of transactions to be processed and a required resource amount, based on correspondence between the past transaction processing amount and the amount of resource used in the past corresponding to the target module stored in the storage means, and generating a predicted transition of the required resource amount by substituting the transaction occurrence amount of the target module corresponding to the predicted transition of transaction occurrence amount for the transaction processing amount of the approximate function; and an allocation means for fluctuating an allocation resource amount of the target module in accordance with the predicted transition of the required resource amount.

11. The resource adjustment apparatus according to claim 1, wherein the generation device generates patterns of a transition of the transaction occurrence amount of a plurality of different cycles based on obtained past transaction occurrence amount of the target module, when generating the transitions of the transaction occurrence amount of the target module, and displays the generated patterns onto a screen.

* * * * *